June 20, 1967 W. O. CRALLE, JR., ET AL 3,326,348
VARIABLE INDEXING APPARATUS
Filed Dec. 29, 1964 6 Sheets-Sheet 1

INVENTORS.
WALTER O. CRALLE, JR.
RAYMOND D. MATHEWS
BY D. Kendall Cooper
ATTORNEY.

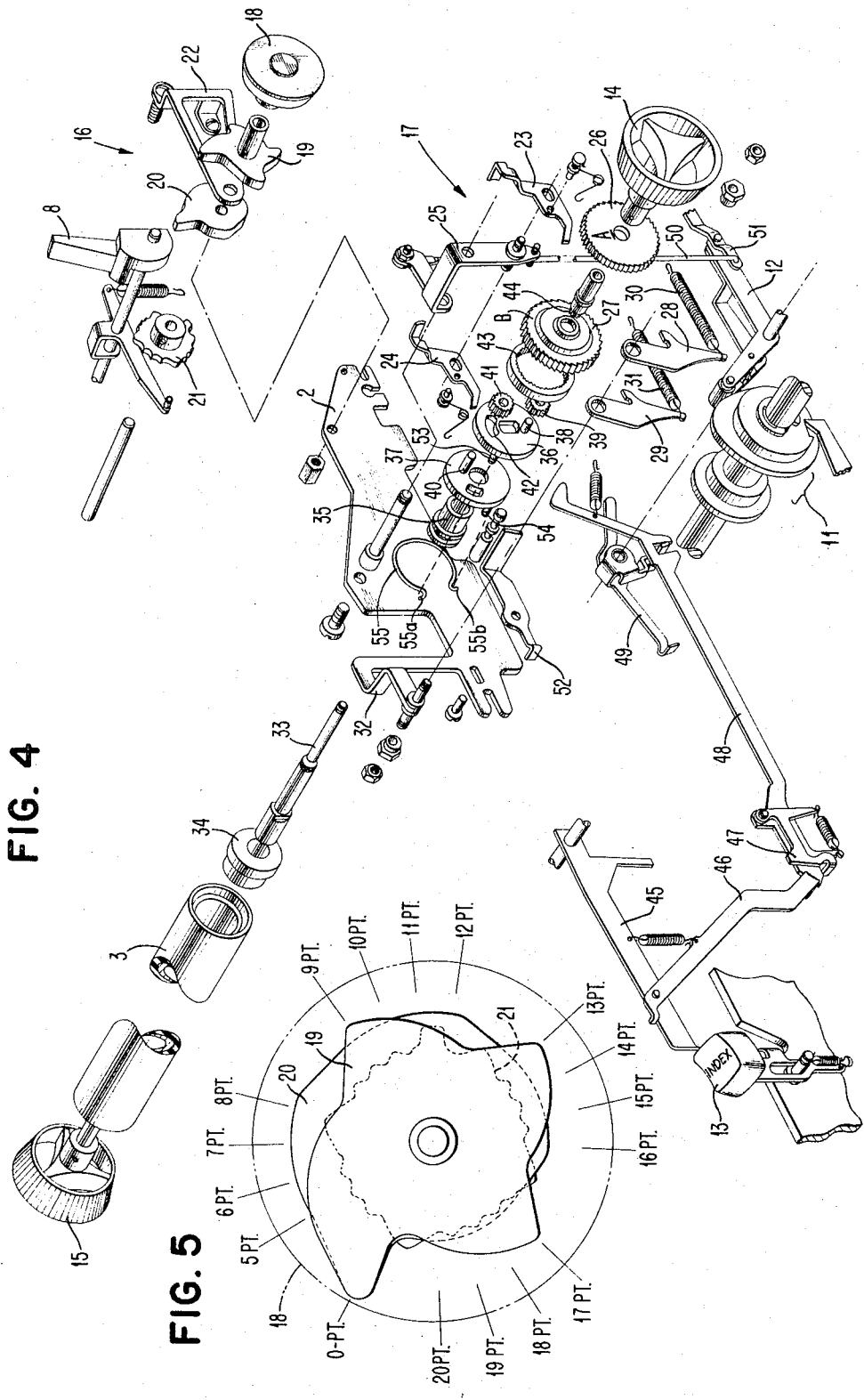

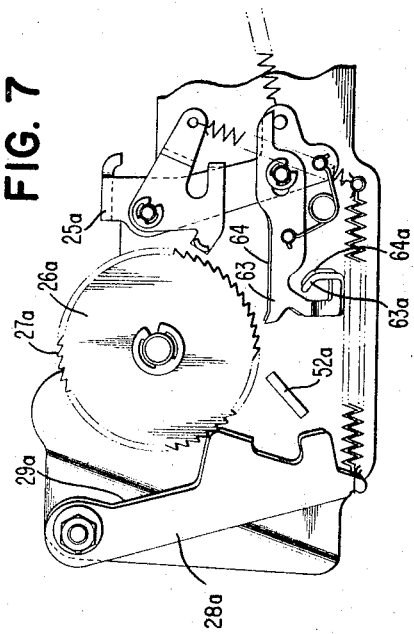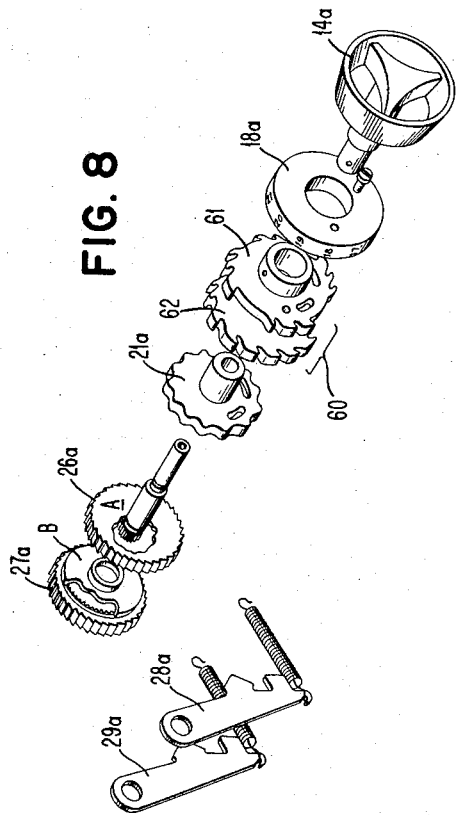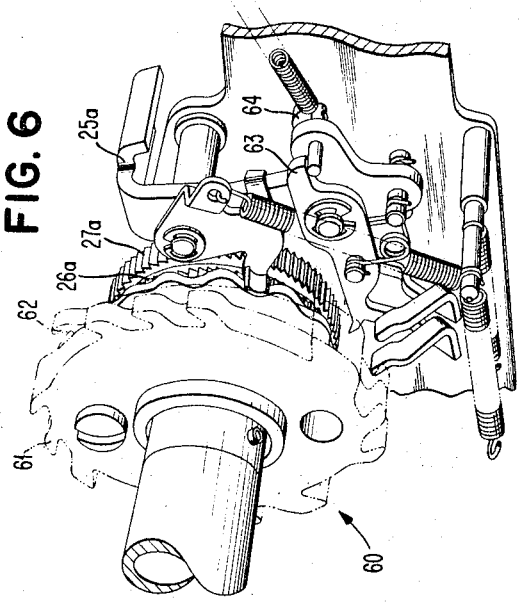

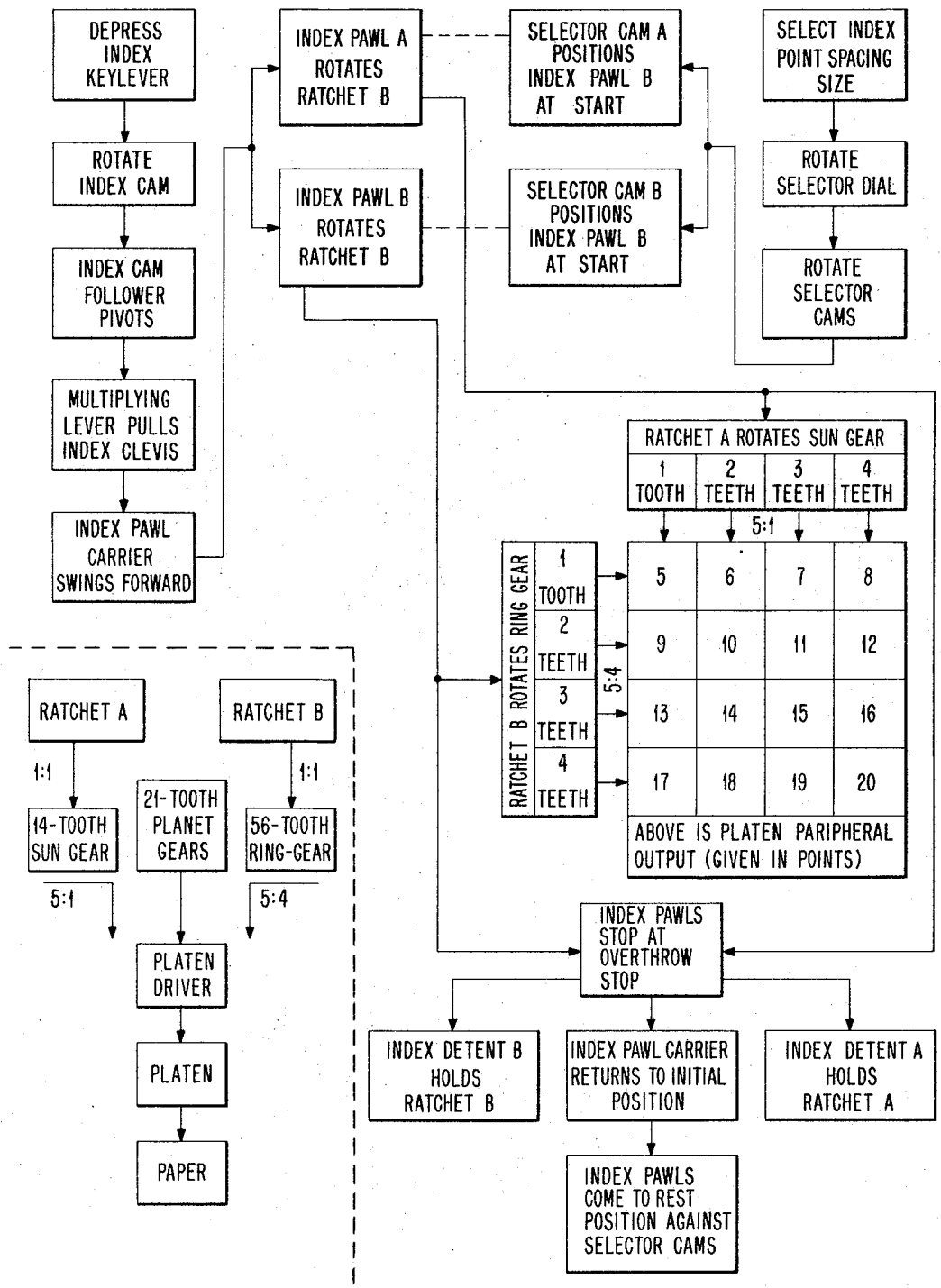

3,326,348
VARIABLE INDEXING APPARATUS
Walter O. Cralle, Jr., Georgetown, and Raymond D. Mathews, Lexington, Ky., assignors to International Business Machines Corporation, Armonk, N.Y., a corporation of New York
Filed Dec. 29, 1964, Ser. No. 421,791
7 Claims. (Cl. 197—114)

This invention relates to indexing apparatus for printing machines and more particularly to apparatus of this nature in which the indexing or incrementing operations can be selectively varied according to the requirements of any particular application. The invention is disclosed in connection with a composing machine, but should find wide utility in a variety of equipment.

The invention is disclosed more particularly in connection with a single head printing apparatus that is fundamentally based on comparable apparatus disclosed in U.S. Patent 2,879,876, L. E. Palmer et al., entitled Single Element Printing Machine, and U.S. Patent 2,919,002, L. E. Palmer, entitled Selection Mechanism for a Single Printing Element Typewriter.

A considerable number of changes have been made in the basic apparatus disclosed in the aforementioned patents, but certain of the principles disclosed therein are applicable to the apparatus disclosed in the present application. Another case of interest in this connection is copending application Ser. No. 311,373 filed Sept. 25, 1963, with Walter O. Cralle et al., as inventors, and having the same assignee as the present application.

In the aforementioned patents, a printing machine is provided with a single element printing head with all the characters of a chosen type font being located on its surface. A character is selected by tilting and rotating the single element printing head in response to depression of one of a plurality of keylevers, each keylever being assigned to a character on the printing head. Keylevers selectively actuate a displacement mechanism having two principal portions, one for tilting and another for rotating the printing head. More specifically, selecting links are operated which determine the pivot points of connecting members to produce an output of predetermined displacement and direction. In each portion of the displacement mechanism, the value of the output is determined by the links selected either singly or in combination. When the links are selected in combination, the displacement is the sum of the individual displacements of the links. Tape and pulley mechanisms couple the displacement mechanism to the printing head to locate the selected character in a reference position. Thereafter, the head is caused to strike the platen to print the selected character.

In the patents noted, a platen is provided which is rotated for document indexing but which is not movable laterally, as in a typebar typewriter. The single element print head is mounted on a carrier and spacing as printing progresses is accomplished by moving the carrier step by step in a path adjacent the platen and parallel with respect thereto.

Besides the normal forward Spacing function, a printing machine of this type generally has provision for other functions such as Backspacing, Carrier Return in order to restore the printing element to the left hand margin, Shifting in order to change the case of printing, Tabulating to effect tabulation of the print head laterally across the document as required, and Indexing which involves the vertical movement of the document with respect to the print head in order to establish a desired line spacing during printing of the document.

An important advantage of the single element print head arrangement in the aforementioned Palmer disclosures is that the head may be easily removed and replaced with another print head in order to change the type style. The changeability of the head besides offering considerable flexibility in printing operations, also presents certain requirements that have to be met. Since different type fonts may be utilized in such equipment, a wide range of type sizes may be encountered from one print head to another. The requirements are such that if the type font size is varied, then other parameters such as spacing and indexing may also have to be varied to accommodate the particular type font in use.

The single element printing equipment disclosed in the Palmer patents and in the Cralle et al. application, lends itself admirably to use in the commercial printing field wherein printed material is prepared for publication. Since the early days of printing, considerable effort has been expended to prepare published material that is easy to read and wherein high standards of clarity and quality of printing are maintained. One of the aspects of this continuing effort is the justification of printed matter within the bounds of the printed page. In order to satisfy the high standards of clarity and legibility, it has been found that justified copy is preferable to unjustified copy. Therefore, material prepared for printing has normally been justified both in a horizontal direction within column boundaries and in a vertical direction within the vertical format limitations of the publication involved.

Many devices have been developed for use in the publishing industry in order to provide justified copy. Perhaps, an outstanding type of device in this area is the Linotype equipment that makes use of hot lead that is cast under selective control of the Linotype operator and which has provision for justifying type slugs within horizontal lines and also for justifying the cast type in a vertical direction rapidly and automatically. More recently, other devices have been developed for preparing master copies that are later used to derive plates for subsequent use in offset printing apparatus.

In offset printing, a draft of the copy is usually prepared first on a composing machine and then proof read for changes, additions or deletions during an editing step. The draft is preferably prepared within certain predetermined horizontal format limitations and vertical format limitations that are normally indicated by blue lines on the draft copy. Following the preparation of the draft and the editing of the draft, a final copy is then prepared on the composing machine. During the preparation of the final copy, the operator keeps in mind certain information that was derived during the preparation of the original draft copy, such as the amount of space remaining in each horizontal line so that the space may be rather evenly distributed throughout the line to achieve a justified horizontal copy and further, the vertical line placement that occurred during the preparation of the draft. Usually, a mental calculation is made of the number of lines required vertically in the copy, and the operator then adjusts the mechanism in order to have the number of lines typed in the final copy come out satisfactorily within the vertical boundaries that were decided upon.

Following the preparation of the justified copy of the material to be published, the copy is usually placed with other similar copy in a paste up version in order to establish a page of material that corresponds to the size of the finished page. Following the paste up procedures, the paste up version is then processed with photo-offset techniques wherein the paste up version is photographed and a printing plate is subsequently prepared for use in an offset printing press.

As noted, a certain number of parameters have to be kept in mind during composing operations. The size of the type or printed character, the horizontal spacing on the printed page, as well as the vertical spacing are all interrelated and a change in size of one of these parameters will affect the requirements imposed on the others. Other factors that must be considered in composing operations are such things as the style of type, that is, whether it is Old style, Modern, Contemporary and so on, whether it is bold face or light face and also the proportions of the type vertically and horizontally. Certain dimensional measurements have been found useful in making a determination of the proper type to use under certain circumstances. In publishing circles, type is generally measured by the "point" system that is based upon the division of an inch into seventy-two equal parts or points. All material used by the typographer including the type itself, the borders, rules, ornaments, and other items are maintained compatible by referencing them to the point system. In the point system the following relationships apply:

Six points equal one nonpareil
Twelve points equal two nonpareils or one pica
Six picas equal one inch
Seventy-two points equal one inch Another standard of reference in working with type styles and horizontal and vertical spacing of type is the "pitch" relationship. This terminology has been more usually applied in office printing equiment than in the publishing field but is related to the point system previously discussed. As an example, the horizontal spacing and size requirements of type may be correlated to a seventy-two pitch, an eighty-four pitch, or a ninety-six pitch, wherein the pitch size indicates the number of units or increments that exist in an inch of distance. The relationship of the pitch system to the point system can be observed by realizing that the ninety-six pitch, for example, includes sixteen units per pica. The eighty-four pitch measurement includes fourteen units per pica, and the seventy-two pitch includes twelve units per pica.

In order to establish standards of uniformity and layout, the character sizes encountered in any type font under consideration are related in some measure to the basic system of measurments that is used. As an example, a character having a relatively small lateral width, such as the letter "i" may require three units of pitch while a character having a wider lateral dimension, such as the character "w" may require nine units of pitch. These requirements of relative unit size hold true regardless of the basic pitch measurements that may be in use at a particular time. Therefore, the character "i" will require three units of space in a seventy-two pitch set up and will also require three units of space in a ninety-six pitch arrangement. It can be seen, therefore, that since the number of units for individual characters remains the same while the pitch is varied, the actual space required or utilized by any particular character will vary according to the pitch used. The foregoing examples of pitch are intended to be exemplary only, and pitch sizes other than those mentioned could be encountered during type composing applications.

As the pitch is varied, in order to maintain proper proportionality in the characters, the vertical allowance for characters must also be varied. Therefore, if the three pitch sizes previously given, that is seventy-two, eighty-four, and ninety-six are used in a selective manner, the vertical point size of the characters involved may vary over a range of six and one-half to fourteen points.

In some instances it may be desirable to have control over the vertical format over a wider range even than the six and one-half points to fourteen points indicated and under these circumstances, a range of for example one to twenty points may be considered desirable. In this case, one point of control directly corresponds to seventy lines per inch while twenty points of control would correspond to 3.6 lines per inch.

As previously noted, a number of devices have been developed for handling the vertical and horizontal composing requirements of publishing firms. Some arrangements have been made in the prior art for affording flexibility in the type size, horizontal spacing, and vertical indexing. Generally, however, these devices have been characterized by an undue amount of complexity or bulkiness. Also, when provision is made for variable indexing, for example, only limited control of the indexing is provided. As an example, if the indexing mechanisms have been set up on the point basis, the mechanisms associated therewith have of necessity been operated on this system only and no other system. At times it becomes desirable to not only have the flexibility afforded by variable indexing but to also complement this with indexing capabilities that are more nearly related to those normally encountered in conventional printing apparatus. These latter capabilities have usefulness during corrective procedures, for example.

Therefore, an object of the present invention is to provide selectively controllable indexing of documents in a printing apparatus.

Another object of the invention is to provide printing apparatus with improved facilities for corrective procedures.

A further object of the invention is to provide printing apparatus with provision for accommodating the vertical indexing requirements of a wide variety of forms.

Still another object of the invention is to provide printing apparatus with provision for insuring proper vertical compatibility of type fonts within a predetermined horizontal requirement.

Another object of the invention is to provide indexing apparatus that is of simplified construction, while maintaining considerable flexibility in operation.

A further object of the invention is to make provision in a printing apparatus for flexible vertical justification during type composing activities.

Another object of the invention is to provide facilities for repeatable superscripting and subscripting in a printing apparatus.

A further object of the invention is to provide apparatus of this nature which operates in an accurate manner and which has provision for automatic wear compensation.

A still further object of the invention is to provide facilities for vertical indexing in a printing apparatus in which the vertical indexing is selectively operable or nonoperable as the circumstances may require.

Another object of the invention is to provide indexing capabilities in a printing apparatus which is characterized by compactness and which may be accommodated generally with no increase in space above that normally available with the apparatus.

Also, an object of the invention is to provide indexing apparatus with simplified selection and control means.

Another object of the invention is to provide an indexing mechanism for printing apparatus in which both automatic and manual control is selectively available.

In order to accomplish these and other objects of the invention, an indexing mechanism of simplified design is provided that affords considerable flexibility in the index range available and that is compact and easily controlled by the operator of the equipment. Also, the mechanism is provided with biasing means for maintaining accuracy of operation and for automatically compensating for wear.

In addition, the mechanism of the present invention lends itself readily to repeated subscripting and superscripting and is selectively controllable to effect indexing under some circumstances or to be inoperable under other circumstances as required.

The mechanism provides facilities both for automatic indexing operations or for manual indexing operations according to the point system as well as manual indexing operation according to some larger increment that is some multiple of the point system.

The foregoing and other objects, features and advantages of the invention will be apparent from the following more particular description of the several embodiments of the invention as illustrated in the accompanying drawings.

In the drawings:

FIG. 4 is an "exploded" view of the apparatus of FIGS. 1-3.

FIG. 5 represents certain of the selector mechanisms in the apparatus of FIGS. 1-4.

Figure 1:
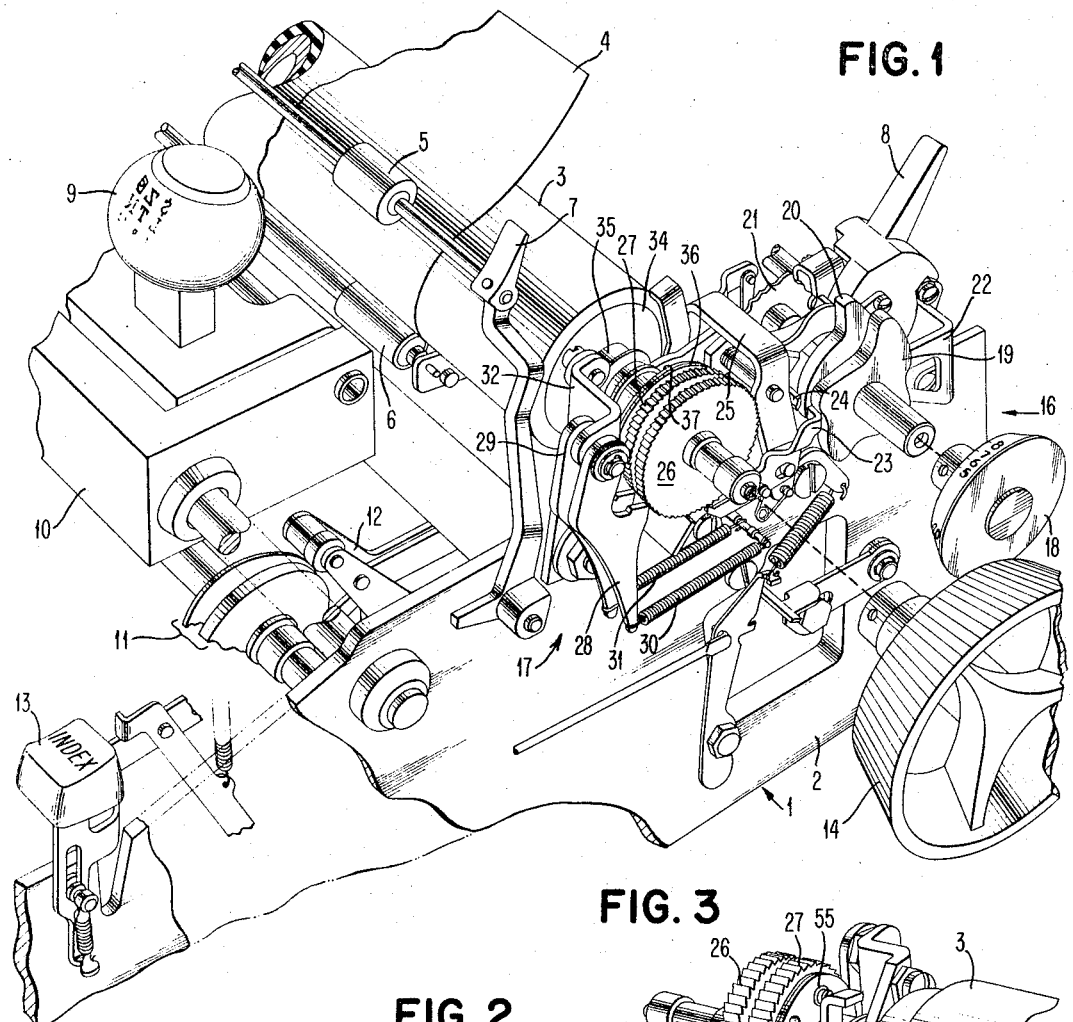
FIG. 1 is a right front perspective view of printing apparatus in which the invention is incorporated.

FIGS. 6, 7, and 8 represent an alternative embodiment for the selector mechanism in the apparatus of FIG. 1.

Figure 9:
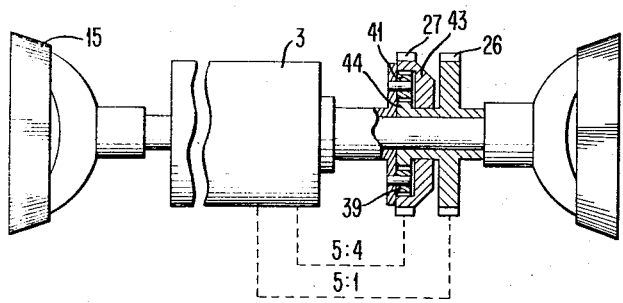
Figure 10:
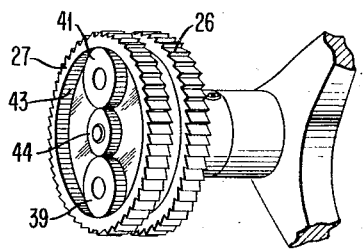

FIGS. 9 and 10 illustrate certain basic principles that apply to the embodiment of FIGS. 1-5, as well as the embodiment of FIGS. 6-8.

Figure 11A:
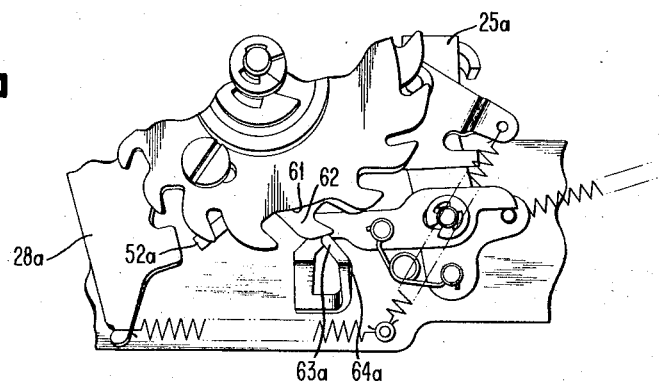
Figure 11B:
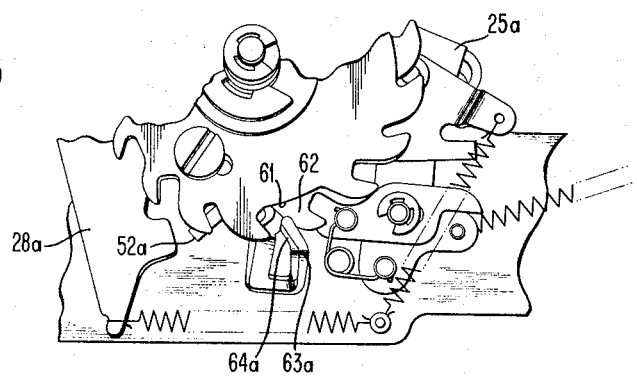
Figure 11C:
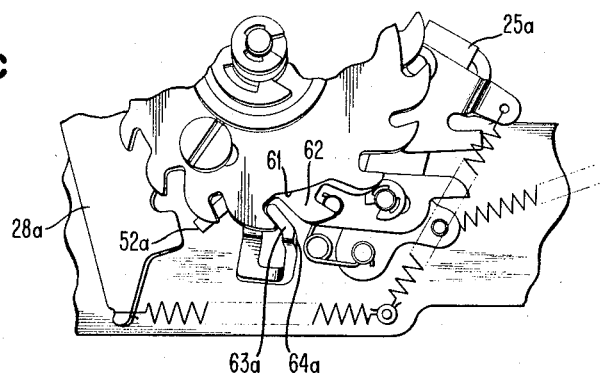
Figure 12A:
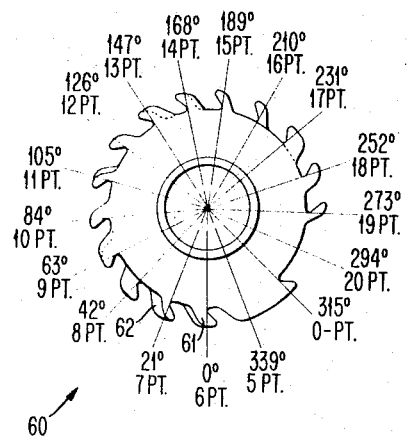
Figure 12B:
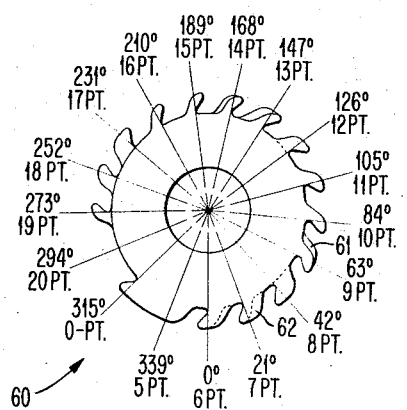
Figure 13:
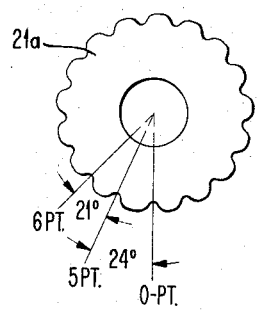
Figure 14A:
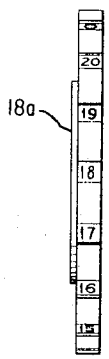
Figure 14B:
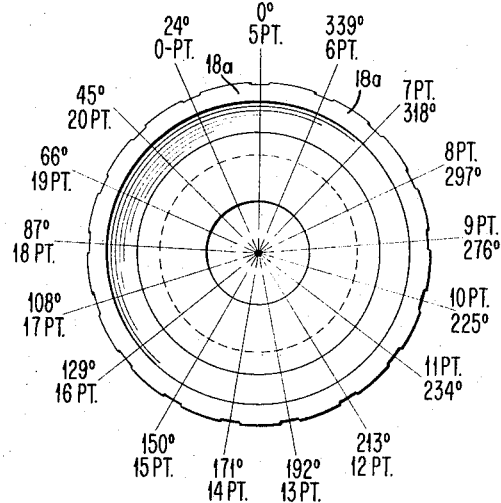

FIGS. 11a, 11b, and 11c represent a sequence of operation of the embodiment of FIGS. 6-8.

FIGS. 12a, 12b, 13, 14a, and 14b represent more detailed renditions of elements involved in the embodiment of FIGS. 6-8.

FIG. 15 illustrates sequences of selection and operation that are applicable to both embodiments of the invention disclosed herein.

In composing activities, such as those encountered in newspaper work, a wide variety of type setting conditions have to be accommodated. For example, in preparing the copy for any particular article, a heading, a subheading, and the body or main copy of the article must be considered. Usually, these various portions of the article are set up with different sizes of type and in many cases are set up with different type styles.

Following are three examples of the line spacing or indexing situations that may be required during composing activities.

7 POINT

We the People of the United States, in order to form a more perfect Union, establish Justice, insure domestic tranquility, provide for the common defence, promote the general Welfare, and secure the Blessings of Liberty to ourselves and our Posterity, do ordain and establish this Constitution for the United States of America.

12 POINT

We the People of the United States, in order to form a more perfect Union, establish Justice, insure domestic tranquility, provide for the common defence, promote the general Welfare, and secure the Blessings of Liberty to ourselves and our Posterity, do ordain and establish this Constitution for the United States of America.

16 POINT

We the People of the United States, in order to form a more perfect Union, establish Justice, insure domestic tranquility, provide for the common defence, promote the general Welfare, and secure the Blessings of Liberty to ourselves and our Posterity, do ordain and establish this Constitution for the United States of America.

While the illustrative paragraphs presented above are typed with the same type style, it is evident that wide variations in the vertical indexing requirements may be encountered. Sample paragraphs have been presented from a lower point setting of seven to a higher point setting of sixteen. However, it may be that a range of, for example, five points to twenty points is required. While the standard paragraphs have used the same type face, it is apparent that the wide variations in point settings will enable the accommodation of type fonts of many different sizes and proportions.

As one of the features of the present invention, the wide range of point settings previously illustrated is easily accommodated and the principles of the invention may be extended in such a manner that point ranges other than those mentioned can also be handled and that other incremental spacings that are fractions or multiples of the point system or that are based on an entirely different system may also be accommodated. As further examples, a range of one-half point to twenty-two points could be used or increments based on one sixty-fourth of an inch could be used instead of those that have just been discussed.

In order to handle all of the conditions that may be encountered in composing activities or in certain printing activities in an office, the novel mechanism according to the present invention utilizes converting means that is selectively responsive to two constant ratio inputs to provide a single controlled variable output that is dependent upon the constant ratios selected.

First embodiment

Reference is first made to FIGS. 1-5 for a description of the mechanisms involved in the first embodiment of the invention. FIGS. 1-4 represent various views of a printing apparatus 1. FIG. 5 represents certain superimposed selector elements used in the printing apparatus of FIGS. 1-4 for variably controlling the indexing operation in the apparatus. Printing apparatus 1 has a frame member 2 which serves as a support for various mechanisms involved in the operation of the device. Apparatus 1 has a platen member 3, for rotatably supporting a document 4 during printing operations. Document 4 is maintained in position by paper bail rollers 5 and 6. Roller 5 is released by moving paper bail lever 7 forwardly. A complete release of document 4 is provided for under control of paper release lever 8.

A single element print head 9 is mounted on a carrier assembly 10 for movement adjacent document 4 and parallel with respect thereto. Print head 9 is comparable to those disclosed in the afore-mentioned Palmer patents and, during printing operations, print head 9 is selectively rotated and tilted in order to effect selection of a particular character for printing on document 4.

As is usual in equipment of this nature, provision is made for automatically indexing document 4 following each Carrier Return operation to the left-hand margin of the document, as well as manually without a Carrier Return operation as required by the operator. The automatic indexing following a Carrier Return operation occurs under control of an index cam assembly 11 and an associated index cam follower 12. An Index keybutton 13 is depressed to initiate an automatic indexing operation. Depression of Index keybutton 13 initiates a cycle of operation during which the index cam assembly 11 and follower 12 are operated to selectively index platen 3, and document 4. Platen 3 and document 4 may also be rotated by means of the right platen knob 14 or the left platen knob 15, FIG. 4.

In accordance with the principles of the present invention, the embodiment of FIGS. 1-5 is provided with certain selector mechanisms indicated generally at 16, and interrelated operating mechanisms indicated at 17, that are selectively operable to index platen 3 and document 4 over a wide range of indexing increments, such as from 5 to 20 points. In addition, the selector mechanisms are settable to a "zero" position, during which no indexing takes place upon operation of the index cam assembly 11, and which is useful under certain circumstances to be discussed.

Figure 3:
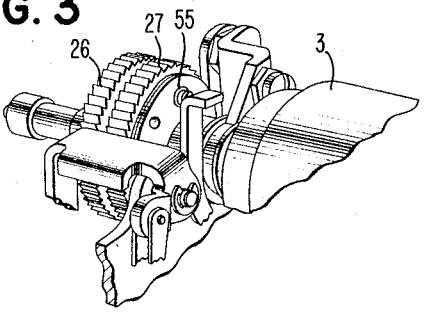
FIG. 3 is another perspective of certain portions of the apparatus in FIGS. 1 and 2.
Figure 2:
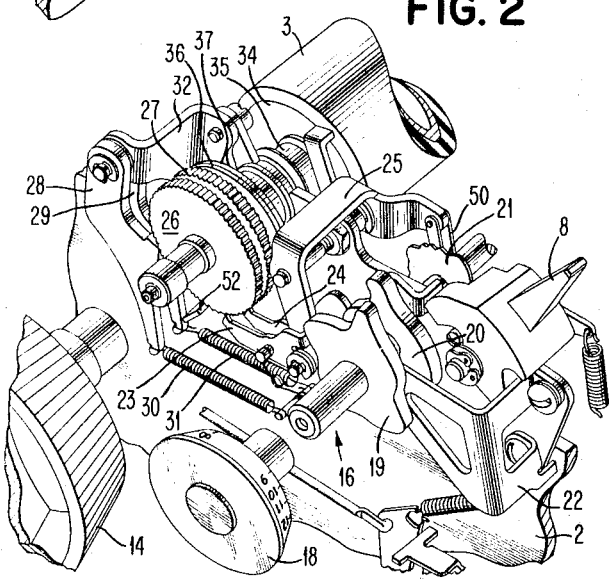
FIG. 2 is a right rear perspective of certain portions of the printing apparatus shown in FIG. 1.

The selector mechanism portion of the apparatus is generally illustrated in FIGS. 1-3 and is shown in considerable detail in FIG. 5.

The selector mechanisms include a selector knob 18 that is marked with designations 0, 5-8, 9-12, 13-16, and 17-20. The designations on knob 18 are positioned in such a manner that they would ordinarily be visible to the operator of the equipment through an opening in the housing, not shown, for setting up the indexing selection desired. Knob 18 is rotated clockwise or counterclockwise and controls the relative positioning of a right index selector cam 19 and a left index selector cam 20. The selector mechanism has a selector detent wheel 21 for detenting the mechanism firmly in the selected position. The selector mechanism is mounted on a bracket 22. A typical dimension of knob 18 is 1.5 inches outside diameter, but this dimension and those of the other selector components may be varied widely.

The operating portion 17 of the embodiment under discussion includes a right index pawl 23, and a left index pawl 24, that are respectively associated with the cams 19 and 20, and that are mounted for movement on an index pawl carrier 25 under control of cams 19 and 20 during operation of the indexing mechanisms. Associated with right index pawl 23 is a right index ratchet 26, and associated with left index pawl 24 is a left index ratchet 27. Ratchets 26 and 27 are maintained in an accurate relationship by a right detent lever 28 and a left detent lever 29 that are held in yielding engagement with the ratchets under control of spring elements 30 and 31. Detent levers 28 and 29 are pivotally mounted on a bracket 32.

Ratchets 26 and 27 form part of a ratio converting mechanism that is responsive to two constant ratio inputs provided by selective movement of pawls 23 and 24 to provide a single predetermined variable output for rotating platen 3 and document 4 an amount that is dependent upon the constant ratio inputs selected. In the preferred embodiments disclosed herein, the ratio converting mechanism is based on planetary gear principles and modes of operation.

In FIG. 4, platen 3 has a right-hand shaft 33 that is retained in the end of the platen by a right end plug 34. Shaft 33 is mounted for rotation in a bushing 35. Attached to shaft 33 is a platen driver 36 and a platen bias plate 37. Mounted on a stud 38 of driver plate 36 is a planet gear 39 and mounted on a stud 40 of bias plate 37 is a planet gear 41. Stud 40 projects through an opening 42 in driver plate 36.

Platen 3 and the associated document 4 are indexed a selectively controlled and variable amount by the rotation of planet gears 39 and 41 under control of a ring gear 43 that is mounted internally of ratchet 27 and a sun gear 44 that is fixed to ratchet 26 and that is rotatable therewith.

The relative relationships of the parts just discussed are illustrated diagrammatically in FIG. 9, which is a cross-sectional view of the assembly, and also in FIG. 10, which is an assembled perspective view of the assembly.

For convenience, ratchet 26 may also be referred to as ratchet A, and ratchet 27 may be referred to as ratchet B. While not intending to be limited thereby, certain relationships that have been found to be useful in practicing the invention are of interest. Referring to FIG. 15, in conjunction with FIGS. 9 and 10, the peripheral rotation of platen 3 is dependent upon the constant input ratio of rotation of ratchet A with respect to platen 3, and the constant ratio input of ratchet B with respect to platen 3. In FIG. 15, the peripheral output of platen 3 is given in points of rotation corresponding to the index increment required as selected by rotation of index selector knob 18, and is indicated as being from 5 points to 20 points. The peripheral outputs required in the chart of FIG. 15 are achieved by selecting certain predetermined ratios for input from ratchet A and ratchet B. In both embodiments discussed herein, ratchet A has a 5:1 constant ratio input, which means that for each tooth of index movement of ratchet A the resulting movement of platen 3 will be equal to one-fifth (⅕) of a tooth. Ratchet B has a constant ratio input of 5:4, which means that for each incremental tooth of rotation of ratchet B, platen 3 will be rotated four-fifths (⅘) of a tooth. Since the input rotation of ratchet A (ratchet 26) is directed through the sun gear 44, and since the input rotation of ratchet B (ratchet 27) is directed through the ring gear 43, the combined output reflected by a consequent movement of the planet gears 39 and 41 that is finally directed to platen 3 through the platen driver plate 36, will depend upon the input ratios selected and will have a predetermined relationship with the selected ratios. Stated another way, a one tooth rotation of ratchet A will result in a one point rotation of platen 3. A one tooth rotation of rachet B will result in a four point output to platen 3. The 5:1 and 5:4 ratios and the desired output rotations are achieved in the present instance by selecting the planetary gear members with a certain number of teeth in order to achieve the desired result. Referring to the lower left corner of FIG. 15, a 14-tooth sun gear, 21-tooth planet gear, and a 56-tooth ring gear, together with the appropriate number of teeth increments on ratchets A and B, will provide the point outputs of 5 to 20 that are indicated in the matrix chart in FIG. 15. Combining the two inputs through the planetary gear arrangement, the following relationships apply:

| Output Rotation of Platen in Points | Rotation of Right-Hand Ratchet A (Ratchet 26) 1 Point of Rotation per Tooth | Left-Hand Ratchet B Rotation (Ratchet 27) 4 Points per Tooth Rotation |
| --- | --- | --- |
| 5  | 1 | 1 |
| 6  | 2 | 1 |
| 7  | 3 | 1 |
| 8  | 4 | 1 |
| 9  | 1 | 2 |
| 10 | 2 | 2 |
| 11 | 3 | 2 |
| 12 | 4 | 2 |
| 13 | 1 | 3 |
| 14 | 2 | 3 |
| 15 | 3 | 3 |
| 16 | 4 | 3 |
| 17 | 1 | 4 |
| 18 | 2 | 4 |
| 19 | 3 | 4 |
| 20 | 4 | 4 |

Referring to the tabulation just given, an input rotation of 4 points which corresponds to 1 tooth of rotation for the left-hand ratchet, plus an input rotation of 1 point which corresponds to a 1 tooth rotation of the right-hand ratchet, will provide an output rotation of 5 points to platen 3. As another example, an output point rotation of 12 is obtained by rotating the left-hand ratchet B two teeth, which equals 8 points of rotation on the output side of the mechanism, and by rotating the right-hand ratchet A four teeth which equals 4 additional points of rotation at the output of the planetary gear mechanism.

The extent of rotation of ratchets A and B as indicated in FIG. 15 is dependent upon the extent of movement of the associated pawls. Pawl A is also designated pawl 23 and pawl B is also designated pawl 24.

In order to effect a desired index rotation of platen 3, index selector knob 18, FIG. 5, is first rotated to the desired point setting. As a consequence of rotation of knob 18, the associated cams 19 and 20 are also rotated to position their cam surfaces adjacent the pawls 23 and 24 for controlling the movement of these pawls during the indexing cycle. In order to demonstrate the operation of the first embodiment of the invention, reference is made to FIGS. 1, 2, 4, and 5.

Selector knob 18 is first set to the desired indexing or point setting. This positions cams 19 and 20 in a particular predetermined relationship with respect to associated pawls 23 and 24. Thereafter, Index keybutton 13 is depressed and this results in the movement of the index keylever 45, keylever pawl 46 and interposer latch 47. Movement of the foregoing mechanisms results in movement of an index interposer 48, which trips an index cam release pawl 49. An indexing cycle is thereafter started by release of the cycle clutch, not shown, but which is described in the aforementioned Palmer patents. Release of the cycle clutch results in rotation of the index cam assembly 11 and a consequent following action of cam follower 12. Attached to cam follower 12 is an index clevis link 50, and associated index multiplying lever 51. Rotation of index cam assembly 11 results in the movement of index clevis link 50 in a downward direction. Movement of index clevis link 50 downward results in a clockwise rotation of the index pawl carrier 25, to which the clevis link 50 is attached. Clockwise rotation and movement of index pawl carrier 25 results in a corresponding movement of pawls 23 and 24 toward their respectively associated ratchets 26 (A) and 27 (B). Pawls 23 and 24 are carried forward toward ratchets 26 and 27, but the cam surfaces of cams 19 and 20, as more fully detailed in FIG. 5, will maintain pawls 23 and 24 in such a position that the forward ratchet engaging portions of the pawls will be postioned relatively close to their respectively associated ratchets, or relatively far away. In this manner, while the pawls 23 and 24 are carried forward to the same extent during any indexing cycle, the time at which they engage their respective ratchets will vary according to the positioning of cams 19 and 20, and therefore, the number of teeth of rotation of ratchets 26 and 27 will also be varied.

As an example of the foregoing indexing operation, reference is made to FIG. 15. If it is desired to increment platen 3 a particular number of points, such as 15 points, knob 18 is set to expose the designation 15. Cams 19 and 20 will thereupon be positioned in relation to pawls 23 and 24 in such a manner that ratchet 26 (A) will be engaged by pawl 23 and rotated 3 teeth, and ratchet 27 (B) will be engaged by pawl 24 and rotated 3 teeth.

At the forward end of movement pawls 23 and 24 encounter a platen overthrow stop 52. As ratchets 26 (A) and 27 (B) are rotated, their associated detent levers 28 and 29 permit them to take up their new positions and also hold them in the new positions. Late in the indexing cycle, the index clevis link 50 is moved upwardly, and the index pawl carrier 25 is thereupon rotated in a counterclockwise direction to restore the indexing pawls 23 and 24 to their home positions against the selector cams 19 and 20.

Extending from the platen driver plate 36 is a stud 53, and extending from the platen bias plate 37 is a stud 54. Coupled to studs 53 and 54 is a platen bias spring 55. Portion 55a of spring 55 engages stud 53 on driver plate 36, and portion 55b of spring 55 engages stud 54 on bias plate 37. Spring 55 is provided in the mechanism to exert a predetermined force on planet gears 39 and 41 with respect to the ring gear 43. The force exerted by spring 55 is applied through the studs 53 and 54 in such a manner that planet gears 39 and 41 are snugly engaged with the ring gear 43, thereby eliminating gear backlash and insuring dependability and accuracy of operation and also compensating for wear in the mechanism. FIG. 3 shows a portion of the indexing mechanisms with spring 55 in position to exert the predetermined amount of force on the gear members for the purposes mentioned.

*Alternative embodiment*

FIGS. 6, 7, and 8 and FIGS. 11–14 illustrate another embodiment of the present invention. Where the elements involved are identical with those in the first embodiment discussed, they are given the same reference numerals with a suffix letter added. Referring to FIGS. 6–8, the selector mechanism involves a cam assembly 60 that is formed from a first cam member 61 and a second cam member 62. The cam assembly 60 can also be formed from a single member with appropriately machined surfaces as illustrated in FIGS. 12a and 12b. The portions of the selector mechanism as they exert control on the indexing mechanism during a typical sequence of operation is illustrated in FIGS. 11a, 11b, and 11c. The detailed configuration of the cams 61 and 62 are shown in FIGS. 12a and 12b, the detent member 21a in FIG. 13 and the selector knob 18a in FIGS. 14a and 14b. The dimensions of these components are not critical but for general information; the dimensions chosen for them in one case were: cams 1.75 inches, outside diameter; detent 1.46 inches, outside diameter; and index selector knob 2.53 inches, outside diameter.

The mechanisms can be compared to those previously discussed, but the principles of selection and operation are somewhat different.

Selection takes place in a manner similar to that previously described in connection with FIG. 15. Selector knob 18a is rotated to a particular point setting. Knob 18a has index point designations on it that correspond to those previously provided on knob 18. The rotation of knob 18a results in a corresponding rotation of the attached cams 61 and 62, and the selector mechanism is detented by means of a detent wheel 21a in a manner similar to the detenting by detent wheel 21.

Referring to FIGS. 6 and 7, ratchet wheels 26a (A) and 27a (B) have pawls 63 and 64 respectively associated therewith. Ratchets 26a and 27a are maintained in accurate positions by detents 28a and 29a. Pawls 63 and 64 are pivotally mounted on the index pawl carrier 25a in a manner comparable to that described in connection with the first embodiment disclosed. Pawl 63 has an extension 63a that is adapted to follow cam surface 61 as pawl 63 moves forwardly. Pawl 64 has an extension 64a that is adapted to follow cam 62 as pawl 64 is moved forward. A platen overthrow stop 52a determines the extent of forward movement of pawls 63 and 64.

The relationship of the cams 61 and 62 with respect to their associated pawls 63 and 64 is such that the pawls are enabled to engage the associated ratchets 26a and 27a either earlier or later in the cycle in a manner somewhat similar to that previously described.

A typical sequence of operation of the second embodiment disclosed herein will be discussed in connection with FIGS. 11a, 11b, and 11c. It is assumed that selector knob 18a has been set to a point setting of 12. FIG. 11a illustrates the mechanism following the selection and rotation of cams 61 and 62 to the 12 point position. At this setting, cam 61 has a dwell surface opposite extension 63a of pawl 63. Following the selection of the desired point setting, the Index keybutton 13 is depressed as previously described. This results in initiation of an indexing cycle and the clockwise rotation of the index pawl carrier 25a. The condition of the pawls and cams as the index pawl carrier is moving forward is illustrated in FIG. 11b. The cuts of the cams 61 and 62 are such that pawl 63 is enabled to engage its associated ratchet 26a (A) earlier in the cycle than the engagement of pawl 64 with ratchet 27a (B). Therefore, as determined by the matrix chart in FIG. 15, ratchet 26a (A) is rotated four teeth, and ratchet 27a (B) is rotated two teeth. Referring to the tabulation previously given, this amount of rotation for ratchets A and B results in a rotation of platen 3 that corresponds to a 12 point rotation. The full forward condition of the mechanisms is shown in FIG. 11c, at which time the pawls 63 and 64 have moved against the overthrow stop 52a. The accommodation of other platen point settings from 5 to 20 under control of the selector mechanism shown is accomplished by selective rotation of knob 18a to any other point setting desired.

*Zero point setting*

Under certain circumstances, it may be desired to have a carrier return operation without an indexing operation. This is controlled in either of the embodiments disclosed by having a selector position designated "0." When the selector knobs 18 or 18a are moved to this position, the selector cams in each case are position in such a manner that neither pawl engages its associated ratchet and, therefore, neither ratchet will be rotated and the platen remains stationary during the indexing operation. The "0" setting has usefulness, as an example, when a line of type is first typed or selected during a "no-print" mode of operation. During this kind of operation, the characters on the line are simply selected and no printing occurs. The purpose of such an operation is to determine the amount of space required by the characters on the line in order to perform horizontal justification of the line. Subsequently, it is desirable to be able to return the carrier and print head to the left-hand margin, but in the same line position so that actual printing of the characters can take place. In this case, no indexing is necessary and, in fact, is not desirable.

*Manual incrementing*

The right-hand platen knob 14, in the case of the first embodiment, and knob 14a, in the case of the second embodiment, is directly attached to the ratchet A. Therefore by manually rotating knobs 14 or 14a, ratchet A is rotated and platen 3 is rotated through the planetary mechanisms, including planet gears 39 and 41. This provides a measure of control of the rotation of platen 3 which is based on a multiple of the indexing inputs normally provided in the mechanism. In this case, manual rotation of knobs 14 or 14a will result in a one-point rotation of the platen 3. Referring to FIG. 4, rotation of the left platen knob 15, due to the planetary gear arrangement previously discussed, results in the rotation of platen 3 an increment of four points. This is a useful increment, for example, when doing corrective procedures since alignment of the typed lines is somewhat easier than it is when using the one point rotation afforded by knobs 14 or 14a.

As one of the features of the present invention, therefore, a wide range of automatic indexing variable outputs is provided by appropriate settings of the selector mechanisms and, in addition, manual control is also provided for rotating the platen in extremely fine 1 point increments or in greater increments such as 4 points, which corresponds more directly to the increments normally provided with office printing equipment.

The flexibility afforded by the inventive arrangements disclosed herein permits the accommodation of a wide variety of documents with their varying format requirements.

The variable characteristics of the present invention permit the handling of type fonts having diverse sizes and proportions.

As another aspect of the usefulness of the invention, it is evident that superscripting and subscripting is easily handled under control of the variable indexing mechanisms. Positioning of lines of printed matter in order to print superscripts and subscripts, wherever they may be required, is expedited in an efficient and repeatable manner.

The indexing arrangements disclosed herein insure complete compatibility with existing publishing requirements and result in compact mechanisms of simplified design.

While the invention has been particularly shown and described with reference to several embodiments, it will be understood by those skilled in the art that various changes in form and detail may be made without departing from the spirit and scope of the invention.

What is claimed is:

1. Variable indexing apparatus, comprising:
 a rotatable member;
 planetary gearing having an output drivingly connected to said rotatable member and said planetary gearing including a set of planet gears mounted for rotation on said member, and said planetary gearing further including a sun gear engaged with said planet gears and a ring gear engaged with said planet gears;
 first driving means arranged in driving relationship to said sun gear;
 a second driving means arranged in driving relationship to said ring gear;
 cyclically operable power means for actuating said first and second driving means;
 index control means for controlling the extent of drive and rotation imparted by said first and second driving means to said planetary gearing and consequently to said rotatable member during a cycle of operation;
 selector means controlled by a single manually settable dial for variably setting said index control means;
 and power control means for initiating a cycle of operation of said power means in order to drive said rotatable member an amount dependent on the setting of said selector means.

2. Variable indexing apparatus, comprising:
 a rotatable member;
 a driver plate coaxially affixed to said rotatable member;
 planetary gearing, said planetary gearing including a set of planet gears mounted for rotation on said driver plate, and said planetary gearing further including a sun gear engaged with said planet gears and a ring gear engaged with said planet gears;
 a first ratchet and associated pawl arranged in driving relationship to said sun gear;
 a second ratchet and associated pawl arranged in driving relationship to said ring gear;
 pawl carrier means supporting each of said pawls for movement toward driving engagement with their associated ratchets;
 cyclically operable power means for driving said pawl carrier means;
 index control means, said control means including first and second cam members respectively positioned adjacent the non-driving ends of said pawls to control the relative positions of said pawls with respect to their associated ratchets and to thereby control the extent of drive and rotation imparted to said ratchets and consequently to said rotatable member during a cycle of operation;
 selector means controlled by a single manually settable dial for variably setting said index control means and said cam members to a predetermined setting;
 and power control means for initiating a cycle of operation of said power means in order to drive said rotatable member an amount that is dependent on the setting of said selector means.

3. Variable indexing apparatus for printing equipment, comprising:
 a platen in said equipment, said platen being rotatably mounted for supporting a document in position to be printed;
 a driver plate coaxially affixed to said platen;
 planetary gearing, said planetary gearing including a set of planet gears mounted for rotation on said driver plate, and said planetary gearing further including a sun gear drivingly engaged at all times according to a first constant ratio with said planet gears and a ring gear drivingly engaged at all times according to a second constant ratio with said planet gears;
 a first ratchet and associated pawl arranged in driving relationship to said sun gear;
 a second ratchet and associated pawl arranged in driving relationship to said ring gear;
 pawl carrier means supporting each of said pawls for movement toward driving engagement with their associated ratchets;
 cyclically operable means for driving said pawl carrier means;
 index control means, said control means including first and second cam members respectively positioned adjacent the non-driving ends of said pawls to control the relative positions of said pawls with respect to their associated ratchets and to thereby control the extent of drive and rotation imparted to said ratchets and consequently to said platen during a cycle of operation;
 selector means controlled by a single manually settable dial for variably setting said index control means and said cam members to a predetermined setting;

first manually operative means connected at all times to said sun gear for directly operating the same in order to effect rotation of said platen through said planetary gearing a predetermined amount that is determined by said first constant ratio;

and second manually operative means connected at all times to the opposite end of said platen for directly operating the same in order to effect rotation of said platen a predetermined amount that is a selected multiple of said first constant ratio.

4. Variable indexing apparatus for printing equipment, comprising:

means for supporting and moving a document;

planetary gearing, said planetary gearing including a set of planet gears mounted to said document supporting and moving means, and said planetary gearing further including a sun gear engaged with said planet gears and a ring gear engaged with said planet gears;

a first ratchet and associated pawl arranged in driving relationship to said sun gear;

a second ratchet and associated pawl arranged in driving relationship to said ring gear;

pawl carrier means supporting each of said pawls for movement toward driving engagement with their associated ratchets;

cyclically operable power means for driving said pawl carrier means;

index control means, said control means including first and second cam members respectively positioned adjacent said pawls to control the relative positions of said pawls with respect to their associated ratchets and to thereby control the extent of drive and rotation imparted to said ratchets and consequently to said document supporting and moving means during a cycle of operation;

selected means controlled by a single manually settable dial for variably setting said index control means and said cam members to a predetermined setting;

and key means for initiating a cycle of operation of said power means in order to drive said document supporting and moving means an amount that is dependent on the setting of said selector means.

5. Variable indexing apparatus for printing equipment, comprising:

a platen in said equipment, said platen being rotatably mounted for supporting a document in position to be printed;

a driver plate coaxially affixed to said platen;

planetary gearing, said planetary gearing including a set of planet gears mounted for rotation on said driver plate, and said planetary gearing further including a sun gear engaged with said planet gears and a ring gear engaged wih said planet gears;

a first ratchet and associated pawl arranged in driving relationship to said sun gear;

a second ratchet and associated pawl arranged in driving relationship to said ring gear;

pawl carrier means supporting each of said pawls for movement toward driving engagement with their associated ratchets;

cyclically operable power means for driving said pawl carrier means;

index control means, said control means including first and second cam members respectively positioned adjacent the non-driving ends of said pawls to control the relative positions of said pawls with respect to their associated ratchets and to thereby control the extent of drive and rotation imparted to said ratchets and consequently to said platen during a cycle of operation;

selector means controlled by a single manually settable dial for variably setting said index control means and said cam members to a predetermined setting;

and power control means for initiating a cycle of operation of said power means in order to drive said platen an amount that is dependent on the setting of said selector means.

6. Variable indexing apparatus for printing equipment, comprising:

a platen in said equipment, said platen being rotatably mounted for supporting a document in position to be printed;

a driver plate coaxially affixed to said platen;

planetary gearing, said planetary gearing including a set of planet gears mounted for rotation on said driver plate, and said planetary gearing further including a sun gear engaged with said planet gears and a ring gear engaged with said planet gears;

a first ratchet and associated pawl arranged in driving relationship to said sun gear;

a second ratchet and associated pawl arranged in driving relationship to said ring gear;

pawl carrier means supporting each of said pawls for movement toward driving engagement with their associated ratchets;

cyclically operable power means for driving said pawl carrier means;

index control means, said control means including first and second cam members coaxially mounted with respect to said platen and respectively positioned adjacent extensions of said pawls to control the relative positions of said pawls with respect to their associated ratchets and to thereby control the extent of drive and rotation imparted to said ratchets and consequently to said platen during a cycle of operation;

selector means controlled by a single manually settable dial mounted coaxially with respect to said platen and said index members for variably setting said index control means and said cam members to a predetermined setting;

and power control key actuated means for initiating a cycle of operation of said power means in order to drive said platen an amount that is dependent on the setting of said selector means.

7. Variable indexing apparatus for printing equipment, comprising:

a platen in said equipment, said platen being rotatably mounted for supporting a document in position to be printed;

a driver plate coaxially affixed to said platen;

planetary gearing, said planetary gearing including a set of planet gears mounted for rotation on said driver plate, and said planetary gearing further including a sun gear engaged with said planet gears for driving the same at a 5:1 ratio and a ring gear engaged with said planet gears for driving the same at a 5:4 ratio;

a first ratchet arranged to drive said sun gear in 1 point increments or multiples thereof depending on a 0, 1, 2, 3, or 4 tooth movement of said ratchet;

a second ratchet arranged to drive said ring gear in 4 point increments or multiples thereof depending on a 0, 1, 2, 3, or 4 tooth movement of said ratchet;

first and second pawls respectively positioned in driving relation to said first and second ratchets;

pawl carrier means supporting each of said pawls for movement toward driving engagement with their associated ratchets;

cyclically operable power means for driving said pawl carrier means;

index control means, said control means including first and second cam members respectively positioned adjacent the non-driving ends of said pawls to control the relative positions of said pawls with respect to their associated ratchets and to thereby selectively control the extent of drive of each of said ratchets in 0, 1, 2, 3, or 4 increments and to consequently drive said platen a zero extent or an extent of 5 to 20 points depending on the settings of said cam members;

selector means controlled by a single manually settable dial for variably setting each of said cam members to a particular setting to effect a desired incremental point rotation of said platen;

and key means for initiating a cycle of operation of said power means in order to drive said platen an amount that is dependent upon the setting of said selector means.

References Cited

UNITED STATES PATENTS

| | | |
|---|---|---|
| 640,208 | 1/1900 | Lambert. |
| 1,357,194 | 10/1920 | Stickney _____ 197—114 |
| 1,737,801 | 12/1929 | Lyle _____ 197—114 |
| 1,944,673 | 1/1934 | Schumacher _____ 197—114 X |
| 2,059,215 | 11/1936 | Dreher _____ 197—114 X |
| 3,163,279 | 12/1964 | Hoysak _____ 197—114 |
| 3,276,562 | 10/1966 | Matthews _____ 197—187 X |

FOREIGN PATENTS 574,699  3/1958  Italy.

ROBERT E. PULREY, *Primary Examiner.*

E. T. WRIGHT, *Assistant Examiner.*